United States Patent [19]
Buonodono et al.

[11] Patent Number: 5,212,885
[45] Date of Patent: May 25, 1993

[54] HIGH GAS SEALIBILITY MAKEUP FOR API BUTTRESS CONNECTIONS

[75] Inventors: Anthony J. Buonodono, Houston, Tex.; James B. Day, New Orleans, La.

[73] Assignee: Exxon Production Research Company, Houston, Tex.

[21] Appl. No.: 822,788

[22] Filed: Jan. 21, 1992

[51] Int. Cl.⁵ .................................................. B23P 15/00
[52] U.S. Cl. ..................................... 29/890.14; 29/407
[58] Field of Search ...................... 29/890.14, 407, 458; 285/93, 333, 334

[56] References Cited

U.S. PATENT DOCUMENTS

| | | | |
|---|---|---|---|
| Re. 34,063 | 9/1992 | Vincent et al. | 29/407 |
| 3,255,521 | 6/1966 | Callahan, Jr. | 29/407 |
| 4,176,436 | 12/1979 | McCombs et al. | 29/407 |
| 4,344,216 | 8/1982 | Finkelston | 29/407 |
| 4,375,121 | 3/1983 | Sigmund | 29/407 |
| 4,592,125 | 6/1986 | Skene | 29/407 |
| 4,962,579 | 10/1990 | Moyer et al. | 29/407 |
| 4,964,305 | 10/1990 | Raulins | 29/407 |
| 4,987,669 | 1/1991 | Makimae et al. | 29/407 |
| 5,131,130 | 7/1992 | Eshghy | 29/407 |

Primary Examiner—Irene Cuda
Attorney, Agent, or Firm—Susan A. McLean

[57] ABSTRACT

Threaded pipe sections are connected to form a casing joint having proper sealing positioning at proper makeup torque. This improved connection includes a first pipe section having a standard API triangle mark at a predetermined position on its exterior surface for the proper axial engagement of the pin member with the coupling or box member. The box member is plated with a metal substantially comprising tin. A thread lubricant containing Teflon ™ is applied to the threads of the pin and/or the threads of the box. The pin member and the box member are helically rotated together up to a minimum of an empirically predetermined torque range. While inexpensive, this improvement provides a simple method to determine visually on the rig floor, or at the pipe rack, whether the joint is properly made up to thereby provide effective gas sealing of the API buttress tapered threaded joint.

4 Claims, 1 Drawing Sheet

HIGH GAS SEALIBILITY MAKEUP FOR API BUTTRESS CONNECTIONS

BACKGROUND OF THE INVENTION

1. Field of the Invention

This invention relates to the field of tubular connections and methods for connecting tubular members, particularly for oilfield connections of threaded buttress pin and box members.

2. Background Description

Pipe sections used in oil fields (for example long sections of well casing) usually have a tapered, exteriorly-threaded male end called a pin member. Such pin members are threaded into couplings, collars or integral female pipe sections called box members. These box members have an interiorly-threaded female end corresponding to their respective pin members.

One type of connection for these joints is the American Petroleum Institute ("API") threaded and coupled connection that achieves its assembly with buttress connections. See Specification for Threading, Gaging, and Thread Inspection of Casing, Tubing and Line Pipe Threads [API Specification Std. 5B] (13th ed. May 31, 1988). These buttress connections provide high tensile load capability, but do not always provide reliable gas sealability performance, and have therefore been used primarily for liquid service applications. API buttress connections have consisted primarily of couplings having zinc phosphate, zinc, or, rarely, tin plated threads; any one of these having the pin and coupling threads lubricated with API modified thread compound (per API Bulletin 5A2). Higher cost proprietary connections are routinely run in place of API buttress connections in high pressure gas applications. It is well known in the petroleum industry that the performance of an API connection is highly dependent on the makeup assembly (engagement) condition of the joint, and therefore it is important to determine if the joint is made-up properly. Assembly conditions include friction-related factors such as thread lubricant, coupling plating type and thickness, surface finishes, eccentricity, ovality, impurities (such as dirt or rust) and external factors, such as stab alignment and wind loading, that occur at the well site.

Several types of methods have been used to monitor and control make-up of oilfield tubular connections. One type of method is the "torque-only" method based upon the read-out of a load cell attached to the joint or power make-up tongs and calibrated for torque. This method has limitations because it does not provide enough information to distinguish quality control problems such as out-of-tolerance threads, cross-threading, or galling.

A second method, "torque-turn," requires sophisticated electronics including a computer and sensors to monitor both the torque and turns which add to operational costs and delay the running time of the pipe sections. The "torque-turn" method is extremely sensitive to reference torque which is a relatively low value, typically 10 percent of the minimum torque. This torque is sometimes determined by API torque recommendations. After this reference torque is reached, a predetermined number of turns are counted in the make-up of the tubular connection. If a false reference torque occurs to activate the turn counter because of one of the above described quality control problems or assembly conditions, an improper joint makeup will result. An example of "torque-turn" monitoring is described in U.S. Pat. No. 3,368,396 to Van Burkleo et al., issued Feb. 13, 1968.

A third method is where the torque which is imposed on premium thread connections between tubular joints is monitored and plotted as a function of time rather than as a function of the number of turns. In this manner, the torque at which shoulder by metal-to-metal sealing contact achieved during makeup of the connection can be detected. Further, torque response of the connection after shoulder may be monitored. An example of this kind of "torque-time" monitoring is described in U.S. Pat. No. 4,738,145 to Vincent et al. issued Apr. 19, 1988.

For API buttress connections, neither the torque-only, torque-turn nor the torque-time methods address the issue of allowing the operator to determine the proper pin member axial engagement or positioning into the box member upon proper makeup of the joint. This is important in determining the amount of radial thread interference and whether the ends of the members have undesirably "butted" together, thereby restricting the bore of the pipe sections or whether there is sufficient thread engagement to withstand subsequent pressure and tensile loading.

U.S. Pat. No. 4,127,927 to Hauk et al. issued Dec. 5, 1978 discloses a fourth method that uses a combination of torque ranges and axial positioning to determine proper joint makeup. In the axial positioning of the pipe sections, a hand tight plane is used as a reference for determining the position of a mark or marks on the pipe section(s). When in the hand tight engagement, the threads have been interengaged to a point where they are in intimate contact but without deformation, preferably reached between 25 to 50 foot pounds. Experience has shown that these relatively low reference torques result in significant variations, even on virtually identical connection specimens.

Hauk '927 discloses a complicated and expensive apparatus, preferably used at the wellsite, that gauges this hand tight plane reference on each individual pin member and then marks each pin member a desired distance from the predetermined hand tight plane. The desired distance from the hand tight plane is determined empirically by making up numerous joints of each type, grade and size of pipe. Because of the variables found in the manufacturing tolerances in tubular connections each tubular joint could have a different hand tight plane reference and therefore a different position on the pipe section for the mark. As is now apparent, Hauk's method requires a time consuming analysis for the marking of each pin member prior to the initial running of the string of pipe sections.

Additionally, the Hauk method uses standardized make-up torques established by the API for each size, weight and grade of casing and tubing. (Hauk, column 1, lines 43–46; column 12, lines 45–57; column 13, lines 35–42.)

The Hauk method (as disclosed in column 14, line 26 to column 15, line 16) teaches torquing a collar upon the pin member until the measured API torque reaches a preselected value. The collar end is then examined for registry with a painted-on line. This painted-on line is applied by reference to the gage (hand tight plane). The torque range is 0.75 to 1.25 times ($\times$) the API optimum torque for the size, weight and grade of pipe. (Hauk column 14, lines 9–14). In Hauk both torque and degree of engagement are monitored; torque by means of a torque gage and position by means of the gage-referenced mark.

U.S. Pat. No. 4,962,579 to Moyer et al., issued Oct. 16, 1990, discloses an improved method of connecting threaded pipe sections to form a tubular joint having proper sealing positioning at proper make-up torque. This improved method comprises a first pipe section having a mark of a prescribed width at a predetermined position window on the first section measured a distance from the end of the pin member. This predetermined position window is the same for all pin members of a similar size, grade, weight and thread type (or form) and therefore the marks can be applied with a simple template prior to the make-up of the joint. The position window is principally determined from finite element analysis. The pin member and box member of a second pipe section are then threaded or screwed (helically rotated) together up to a minimum of an empirically predetermined torque range. This torque range is predetermined by testing and/or finite element analysis of representative joints of a certain thread type, size, weight, and grade of pipe section. If required, the torque range is adjusted by empirically determined friction factors. If upon make-up, the joint is visually inspected on the rig floor to be within the proper position and within the proper torque range, the joint is acceptable. The Moyer et al. patent does not disclose the use of this method with buttress connections; nor does it disclose a synergistic effect in combining this method with tin plated coupling threads and Teflon TM pipe lubricant.

SUMMARY OF THE INVENTION

A method of coupling API buttress connections in such a way as to provide high sealability in high pressure gas applications is disclosed. Called the "4T method" (for Torque, Triangle, Tin and Teflon), this method requires:

1. API buttress connections with pin members stamped with a triangle in
   accordance with API Specification Std. 5B (13th Ed. May. 31, 1988), particularly as described in Section 2 therein;
2. Box members or couplings wherein the threads are plated with tin, preferably to a thickness of about 0.0035 inch±0.001 inch;
3. Teflon TM thread lubricant, preferably Liquid-O-Ring #304 or its equivalent; and
4. The use of the method of Moyer et al. to determine proper torque. Appropriate torque and position values for various size, weights and grades of API buttress connections are set forth in Table 1.

As can be recognized in this disclosure, use of this method provides surprisingly effective high pressure gas sealability, at much lower cost than required in using premium connections.

Other improvements, advances and uses of this invention would be obvious to one skilled in the art.

BRIEF DESCRIPTION OF THE DRAWING

The objects, advantages and features of the invention will become more apparent by reference to the drawing which are appended hereto and wherein like numerals indicate like parts and wherein an illustrative embodiment of the invention is shown in which.

DESCRIPTION OF THE INVENTION

General Description of the Method

Figure 1:
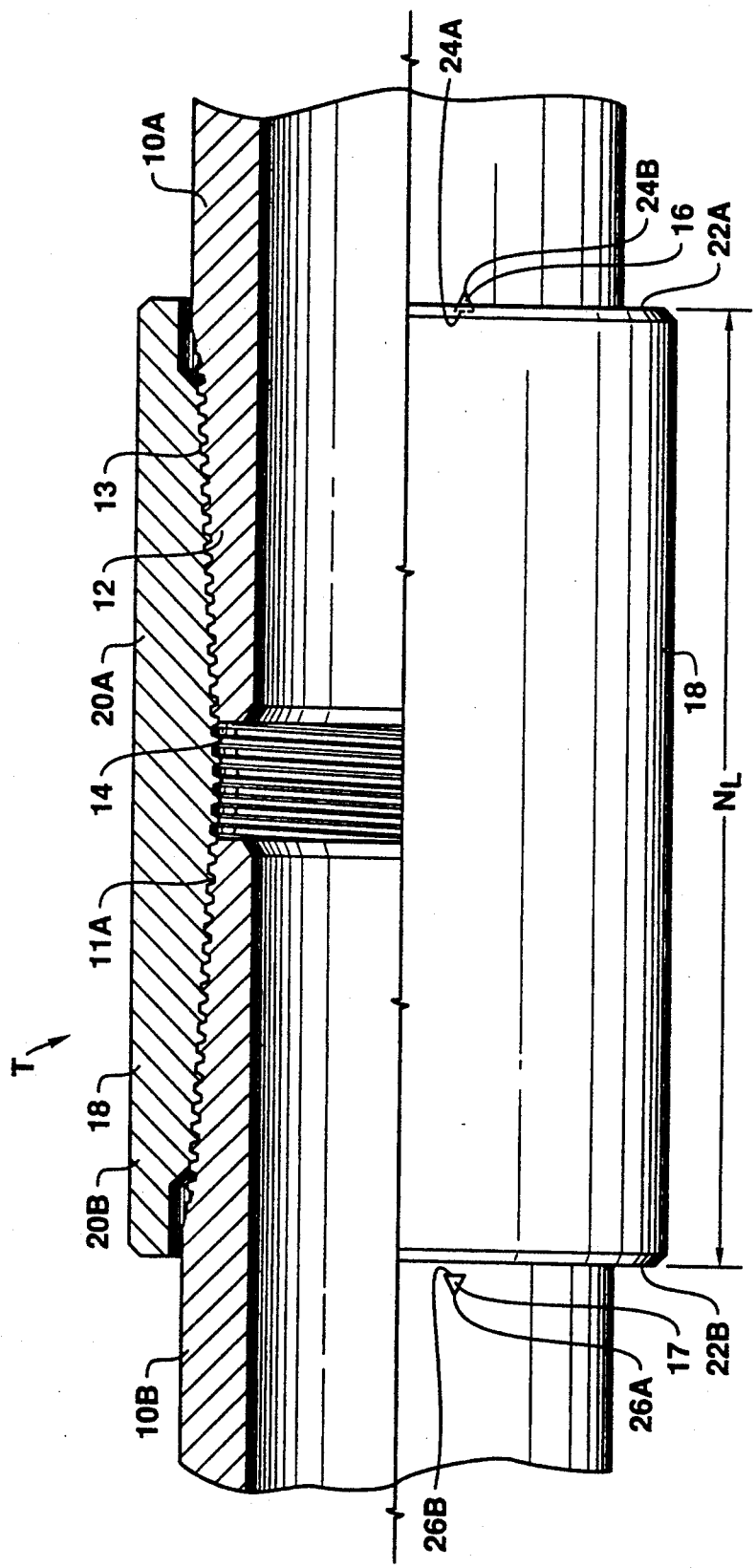
FIG. 1 illustrates a made-up coupling and two pin members shown in partial section view which shows proper and improper positioning of the respective triangle markings on both pin members relative to the coupling.

A tubular joint embodying the present invention is shown in detail in FIG. 1 will be discussed in detail below. The present invention can be used with casing. It is to be understood that the joint can be used with a coupling, collar or conventional box member as illustrated in the FIGURE.

The present invention is advantageously used with a buttress connection.

A first pipe section 10A includes an externally threaded pin member 12 having a face 14 at its end. The first pipe section 10A is provided with a triangle mark 16 at a predetermined position on the exterior surface of the section 10A, in accordance with API Std. 5B. A second pipe section or coupling 18 with length $N_L$ includes two corresponding threaded box members 20A and 20B having respective faces 22A and 22B at their ends, as shown in FIG. 1. The internal threads are plated with tin 11A. A teflon-containing thread lubricant 13 is applied to the threads, preferably the internal threads, prior to coupling. The improved method includes continuously or discontinuously helically rotating the pin member 12 and the box member 20A of pipe coupling 18 together up to a minimum of an empirically and/or analytically predetermined torque range, wherein the triangle mark is partially obscured.

The tubular joint is then observed and if the face 22A of the box member 20A is properly positioned relative to the triangle mark 16 on the pipe section 10A, the joint is acceptable and make-up is terminated. If the face 22A has not reached the edge 24 A of the triangle mark 16, the torque is increased until either the face 22A progresses into the body of the triangle mark 16 or until maximum torque occurs. If the face 22A enters the body of the triangle mark 16 at a torque between the empirically and/or analytically determined minimum and maximum defined torque values, the joint connection is acceptable.

By contrast, the other pipe section 10B in coupling 18 is improperly connected to its box member 20B, in that the face 22 B is not at least aligned with triangle base 26 B, leaving triangle 17 completely exposed.

Another important advantage of this method is that the pipeyard or laboratory "buck on" torque may be different from the rig floor make-up torque. The "buck-on" machine grips both the pipe sections outside surfaces and effectively makes the box member stiffer, typically resulting in higher torque than the rig floor make-up (often referred to as floating or free make-up) where on the pin member pipe sections are gripped. Although these two torque operations require different torque values, the triangle marks remain identical because the needed threaded axial engagement remains the same. Therefore, the thread torque values can be prescribed for specific torque operation. In practice, this has usually only affected the above discussed minimum torque values.

There is great economic incentive to improve the sealability performance of API buttress connections. The API buttress connection is much less expensive than the alternative choice of premium connections. Historically, API buttress connections have not been utilized in applications where gas sealability is a primary concern; premium connections have typically been used in these applications.

BEST MODE

The sealing capability of the API buttress connection is dependent on the thread lubricant that is trapped in the thread area. The type of lubricant, coupling plating type, magnitude of internal pressure applied, and the length of the thread helix all affect the ability of the buttress connection to seal in gas applications. The smaller the pipe diameter, and the higher the grade, the more difficult it is to obtain a seal. This is true for two reasons: 1) the internal pressure design rating of the thread material is higher and 2) the length of the thread helix is shorter.

Based on the result of testing, the following conclusions are made:

The 4T makeup method provides gas tight sealability for buttress casing connections P-110 grade and lower for casing sizes 8⅝ inch OD through 13⅜ inch OD.

Connections consisting of tin plated couplings lubricated with API modified thread lubricant, made-up to within the API triangle stamp, provide gas tight sealability for buttress casing connections 80 grade and lower, for casing sizes 8⅝ inch OD through 13⅜ inch OD.

Connections consisting of phosphatized couplings lubricated with API modified thread lubricant, made-up to within the API triangle stamp, provide liquid pressure sealability for buttress casing connections P-110 grade and lower for casing sizes 8⅝ inch OD through 13⅜ inch OD.

API seal-ring couplings do not reliably provide gas tight sealability for buttress casing sizes 8⅝ inch through 13⅜ inch OD.

As a result of the sealability study described below, a makeup condition has been developed that provides gas tight sealability for all weight and grade combinations of API buttress connections sizes 8⅝ inch through 13⅜ inch OD. This makeup condition consists of tin plated couplings with a plating thickness of 0.0035 inch +/− 0.001 inch, lubricated with Liquid O-Ring #304 Teflon ™ thread lubricant on both the pin and coupling, and made-up to within the API triangle stamp. This makeup condition successfully contains gas internal pressure, assuming all thread elements are within API tolerances.

EXAMPLES

The testing program was begun with 9⅝ inch OD, 47 lb/ft, P-110 grade casing, since from a sealability standpoint, this was the worst case size and grade combination in the 9⅝ inch through 13⅜ inch OD size range.

Initially, six different makeup conditions were evaluated in the search for a gastight connection. They were:
1. Phosphatized couplings, lubricated with API modified thread lubricant (Exxon Thredkote 706)
2. Phosphatized couplings, lubricated with Teflon ™ thread lubricant (Liquid-O-Ring #304)
3. Tin plated couplings, lubricated with API modified thread lubricant
4. Tin plated couplings, lubricated with Teflon ™ thread lubricant
5. Phosphatized couplings fitted with Teflon ™ seal rings and lubricated with API modified thread lubricant
6. Phosphatized couplings lubricated with Threadmasters SEALLUBE ™ product (both Mill-end and Field-end products)

At the completion of the 9⅝ inch, 47 lb/ft, P-110 grade casing sealability study, the following size, weight and grade combinations also underwent sealability testing:
8⅝ inch, 24 lb/ft, K-55
8⅝ inch, 36 lb/ft, L-80
8⅝ inch, 49 lb/ft, P-110
9⅝ inch, 40 lb/ft, L-80
9⅝ inch, 47 lb/ft, L-80
9⅝ inch, 53.5 lb/ft, P-110
10¾ inch, 40.5 lb/ft, K-55
10¾ inch, 51 lb/ft, L-80
10¾ inch, 65.7 lb/ft, P-110
11¾ inch, 60 lb/ft, P-110
11¾ inch, 65 lb/ft, L-80
13⅜ inch, 68 lb/ft, K-55
13⅜ inch, 72 lb/ft, L-80 and
13⅜ inch, 72 lb/ft, P-110

All test specimens underwent thread gaging to ensure that all thread element dimensions were within API tolerances. The worst case thread root-to-crest and thread flank clearances that can occur with buttress threads within the API tolerances are 0.002 inch and 0.007 inch, respectively. Coupling tin plating thickness was specified as 3.5 mils +/− 1 mil (0.0035 inch +/− 0.001 inch) for the test program. At the low end of the tolerance, the tin plating thickness will completely fill the thread root to crest clearance and most of the thread flank clearance, greatly minimizing the area that the thread lubricant must bridge off to effect a seal. Phosphatization of couplings, on the other hand, produces a maximum plating thickness of 0.0001 inch, resulting in significantly greater thread clearance areas that the thread lubricant must bridge off.

SEALABILITY TESTING 9⅝ INCH 47 LB/FT P-110 BUTTRESS CONNECTION

EXAMPLE 1

Tin Plated Couplings
API Modified Thread Lubricant

The sealability testing program commenced with buttress casing specimens consisting of tin plated couplings lubricated with API modified thread lubricant that were made up to the base of the API triangle stamp position (as a minimum makeup position). sealability testing with connections made-up to other positions was conducted separately.

Sealability testing of 9⅝ inch OD and smaller buttress casing connections consisted of internal pressure testing to 80% of the pipe body internal yield pressure (IYP), followed by combined internal pressure and tension loads to 80% IYP and 75% of the thread body yield strength (PBYS). The testing parameters are summarized in Table 3. Testing continued with combined internal pressure with compression loads to 80% IYP and −50% PBYS. If the connection successfully sealed to this point, the process was repeated with up to 10 degrees per 100 feet of bending. This process was conducted three times; first with liquid internal pressure at ambient temperature, then with gas (N₂) at ambient temperature, then with gas at elevated temperature (300 degrees F). Buttress casing sizes greater than 9⅝ inch OD were not tested at elevated temperature or with applied bending loads, since they are generally not subjected to high downhole temperatures or large curvatures. Aside from these differences, the testing program was the same for all sizes.

The test results from tin plated couplings lubricated with API modified thread lubricant revealed that this makeup condition will not reliably seal gas internal pressure for this size, weight, and grade combination. These results are summarized in Table 2.

EXAMPLE 2

Tin Plated Couplings
Teflon TM Thread Lubricant

Test specimens consisting of tin plated couplings lubricated with Teflon TM thread lubricant were evaluated next. Liquid O-Ring #304 Teflon TM thread lubricant was selected for these tests. Three test specimens were assembled, with makeup to the base of the triangle stamp, and submitted to testing. All three of the specimens successfully completed all phases of the test program. In an effort to further quantify the performance of this makeup condition, some specimens were specially machined to worst-case API tolerances for further testing.

Pins and couplings were machined to provide the worst possible combination of tapers (fast pin and slow box) within API tolerances. This combination produced zero thread interference at the pin nose when made up to the base of the API triangle stamp. Other pins and couplings were specially machined to provide the worst case thread width dimensions that were possible within API tolerances, as described earlier. Also, the tin plating on the couplings was specified as 2.5 mils, to simulate the worst case (thinnest) tin plating dimension within test specification. All of the specially machined specimens were lubricated with Teflon TM lubricant and made-up to the base of the API triangle stamp. All of these specimens successfully completed the testing program. Test results are shown in Table 2.

For API buttress connections the bridging characteristics of the Liquid O-Ring #304 Teflon TM thread lubricant is significantly better than those of API modified thread lubricant when used in conjunction with the tin plated couplings. The Teflon TM lubricant consists of coarsely ground Teflon TM in a grease carrier. There are no metallic compounds present. The Teflon TM particles apparently become compressed into void spaces in the thread helix during makeup, effectively bridging off the leak path through which internal gas pressure could otherwise leak.

EXAMPLE 3

Phosphatized Couplings
API Modified Thread Lubricant

Specimens consisting of phosphatized couplings lubricated with API modified thread lubricant were made-up to the base of the API triangle stamp and tested. The results indicated that this makeup condition is suitable for liquid pressure applications, but not for gas pressure applications. The specimens failed to seal gas internal pressure. Additional tests were conducted at a later date that were made-up to the apex of the triangle. Some of these also leaked. Test results are summarized in Table 2.

EXAMPLE 4

Phosphatized Couplings
Teflon TM Thread Lubricant

Specimens consisting of phosphatized couplings lubricated with Teflon TM thread lubricant were made-up to the base of the API triangle stamp and tested. This makeup condition is also suitable for liquid pressure applications, but not for gas pressure applications. These specimens failed to seal gas internal pressure. Test results are summarized in Table 2.

EXAMPLE 5

Special Configurations

Two other makeup configurations were evaluated during the sealability program in an effort to determine whether other gas tight buttress connection configurations were available. The two configurations were 1) API seal-ring couplings lubricated with API modified thread lubricant, and 2) Phosphatized couplings lubricated with Threadmasters SEALLUBE TM product.

API Seal-Ring Couplings

Test specimens consisting of API seal-ring couplings lubricated with API modified thread lubricant were made-up to the base of the triangle stamp and tested. The couplings were purchased according to SR-13 of API Spec 5CT. Seal-rings and seal-ring groove dimensions were verified prior to testing. All seal-rings were carefully installed just prior to makeup. Three specimens were tested. Two specimens successfully completed all tests, while the other specimen failed to contain gas internal pressure at elevated temperature. Therefore, seal ring buttress couplings are not recommended since even the greatest care and handling under laboratory conditions will not ensure a gas seal. Test results are summarized in Table 2.

Threadmasters SEALLUBE TM Product

Threadmasters Inc. is a Houston based company that markets and supports the SEALLUBE TM tubular thread sealant compound. Threadmasters markets two SEALLUBE TM products, the mill-end and field-end products. The products are deemed identical in performance by the manufacturer, except that the mill-end requires about twice the torque to break-out than the field-end product. The compound has been used successfully on API 8-round connections that were significantly out of tolerance, and as a result was thought to have potential for successful applications with the buttress connection. One specimen was assembled with mill-end compound and another with field-end compound. Both specimens were made-up to the base of the API triangle stamp and tested.

Both specimens successfully completed the liquid pressure testing, but leaked during gas pressure testing when a compression load was applied. Application of the compression load possibly caused the load flanks of the connection to separate, providing a leak path through which the gas could pass. This load flank "unloading" phenomenon apparently is not present with tin plated couplings since the thread flank voids are virtually filled with tin material.

EXAMPLE 6

SEALABILITY TESTING OF 8⅝ INCH K-55 THROUGH 13⅜ INCH P-110

Sealability testing of 8⅝ inch through 13⅜ inch K-55 grade through P-110 grade buttress casing connections was conducted to further define the sealability limits of buttress connections, and to further investigate the performance of the tin plated coupling with Teflon TM lubricant makeup combination.

Based on the 9⅝ inch, 47 lb/ft, P-110 test results, sealability testing of 8⅝ inch through 13⅜ inch buttress casing connections was limited to three makeup conditions as follows:

Phosphatized couplings, lubricated with API modified thread lubricant (Exxon Thredkote 706)

Tin plated couplings, lubricated with API modified thread lubricant

Tin plated couplings, lubricated with Teflon ™ thread lubricant (Liquid O-Ring #304)

Sealability testing of the 8⅝ inch through 13⅜ inch OD connections revealed some very interesting results. The only makeup condition that successfully sealed gas internal pressure 100% of the time for all size, weight and grade combinations was the tin plated coupling with Teflon ™ lubricant combination. For 80 ksi and lower grade materials, tin plated couplings with API modified thread lubricant successfully sealed gas internal pressure 100% of the time. For all size, weight and grade combinations tested, phosphatized couplings with API modified thread lubricant successfully sealed liquid internal pressure 100% of the time.

TABLE 1

TORQUE TABLE
TORQUE POSITION VALUES FOR 4T MAKEUP METHOD

| | | EXXON TORQUE-POSITION TABLES | | | POSITION | | TORQUE | |
|---|---|---|---|---|---|---|---|---|
| Size (in.) | Wt. (lb/ft) | Thread | Grade | Joint OD (in.) | D1 (in.) | D2 (in.) | T-min (ft-lb) | T-max (ft-lb) |
| 8⅝ | 32 | BTC | 55 | 9.625 | 4.813 | 5.188 | 5,550 | 8,350 |
| 8⅝ | 36 | BTC | 55 | 9.625 | 4.813 | 5.188 | 5,750 | 8,650 |
| | | | 75 | | 4.813 | 5.188 | 6,000 | 9,000 |
| | | | 80 | | 4.813 | 5.188 | 6,050 | 9,100 |
| | | | 90 | | 4.813 | 5.188 | 6,200 | 9,300 |
| | | | 95 | | 4.813 | 5.188 | 6,250 | 9,400 |
| 8⅝ | 40 | BTC | 75 | 9.625 | 4.813 | 5.188 | 6,400 | 9,600 |
| | | | 80 | | 4.813 | 5.188 | 6,500 | 9,800 |
| | | | 90 | | 4.813 | 5.188 | 6,600 | 9,900 |
| | | | 95 | | 4.813 | 5.188 | 6,650 | 10,000 |
| | | | 110 | | 4.813 | 5.188 | 6,850 | 10,300 |
| 8⅝ | 44 | BTC | 75 | 9.625 | 4.813 | 5.188 | 6,600 | 9,900 |
| | | | 80 | | 4.813 | 5.188 | 6,650 | 10,000 |
| | | | 90 | | 4.813 | 5.188 | 6,800 | 10,200 |
| | | | 95 | | 4.813 | 5.188 | 6,850 | 10,300 |
| | | | 110 | | 4.813 | 5.188 | 7,100 | 10,700 |
| 8⅝ | 49 | BTC | 75 | 9.625 | 4.813 | 5.188 | 6,750 | 10,100 |
| | | | 80 | | 4.813 | 5.188 | 6,800 | 10,200 |
| | | | 90 | | 4.813 | 5.188 | 6,950 | 10,400 |
| | | | 95 | | 4.813 | 5.188 | 7,050 | 10,600 |
| | | | 110 | | 4.813 | 5.188 | 7,250 | 10,900 |
| 9⅝ | 36 | BTC | 55 | 10.625 | 4.813 | 5.188 | 5,800 | 8,700 |
| 9⅝ | 40 | BTC | 55 | 10.625 | 4.813 | 5.188 | 5,950 | 8,900 |
| | | | 75 | | 4.813 | 5.188 | 6,200 | 9,300 |
| | | | 80 | | 4.813 | 5.188 | 6,250 | 9,400 |
| | | | 90 | | 4.813 | 5.188 | 6,400 | 9,600 |
| | | | 95 | | 4.813 | 5.188 | 6,450 | 9,700 |
| 9⅝ | 43.5 | BTC | 75 | 10.625 | 4.813 | 5.188 | 6,650 | 10,000 |
| | | | 80 | | 4.813 | 5.188 | 6,700 | 10,050 |
| | | | 90 | | 4.813 | 5.188 | 6,850 | 10,300 |
| | | | 95 | | 4.813 | 5.188 | 6,900 | 10,350 |
| | | | 110 | | 4.813 | 5.188 | 7,150 | 10,700 |
| 9⅝ | 47 | BTC | 75 | 10.625 | 4.813 | 5.188 | 6,750 | 10,150 |
| | | | 80 | | 4.813 | 5.188 | 6,800 | 10,200 |
| | | | 90 | | 4.813 | 5.188 | 6,950 | 10,450 |
| | | | 95 | | 4.813 | 5.188 | 7,050 | 10,600 |
| | | | 110 | | 4.813 | 5.188 | 7,250 | 10,900 |
| 9⅝ | 53.5 | BTC | 75 | 10.625 | 4.813 | 5.188 | 6,900 | 10,350 |
| | | | 80 | | 4.813 | 5.188 | 7,000 | 10,500 |
| | | | 90 | | 4.813 | 5.188 | 7,100 | 10,650 |
| | | | 95 | | 4.813 | 5.188 | 7,200 | 10,800 |
| | | | 110 | | 4.813 | 5.188 | 7,400 | 11,100 |
| 10¾ | 40.5 | BTC | 55 | 11.750 | 4.813 | 5.188 | 5,350 | 8,950 |
| 10¾ | 45.5 | BTC | 55 | 11.750 | 4.813 | 5.188 | 5,800 | 8,700 |
| 10¾ | 51 | BTC | 55 | 11.750 | 4.813 | 5.188 | 6,450 | 9,700 |
| | | | 75 | | 4.813 | 5.188 | 6,750 | 10,150 |
| | | | 80 | | 4.813 | 5.188 | 6,800 | 10,200 |
| | | | 90 | | 4.813 | 5.188 | 6,950 | 10,450 |
| | | | 95 | | 4.813 | 5.188 | 7,000 | 10,500 |
| | | | 110 | | 4.813 | 5.188 | 7,200 | 10,800 |
| 10¾ | 55.5 | BTC | 75 | 11.750 | 4.813 | 5.188 | 7,150 | 10,750 |
| | | | 80 | | 4.813 | 5.188 | 7,200 | 10,800 |
| | | | 90 | | 4.813 | 5.188 | 7,350 | 11,050 |
| | | | 95 | | 4.813 | 5.188 | 7,450 | 11,200 |
| | | | 110 | | 4.813 | 5.188 | 7,650 | 11,500 |
| 10¾ | 60.7 | BTC | 90 | 11.750 | 4.813 | 5.188 | 7,550 | 11,350 |
| | | | 95 | | 4.813 | 5.188 | 7,650 | 11,500 |
| | | | 110 | | 4.813 | 5.188 | 7,850 | 11,800 |
| 10¾ | 65.7 | BTC | 90 | 11.750 | 4.813 | 5.188 | 8,050 | 12,100 |
| | | | 95 | | 4.813 | 5.188 | 8,150 | 12,250 |
| | | | 110 | | 4.813 | 5.188 | 8,400 | 12,600 |
| 11¾ | 47 | BTC | 55 | 12.750 | 4.813 | 5.188 | 6,150 | 9,250 |
| 11¾ | 54 | BTC | 55 | 12.750 | 4.813 | 5.188 | 6,500 | 9,750 |
| 11¾ | 60 | BTC | 55 | 12.750 | 4.813 | 5.188 | 6,650 | 10,000 |
| | | | 75 | | 4.813 | 5.188 | 6,900 | 10,350 |
| | | | 80 | | 4.813 | 5.188 | 7,000 | 10,500 |
| | | | 90 | | 4.813 | 5.188 | 7,150 | 10,750 |
| | | | 95 | | 4.813 | 5.188 | 7,250 | 10,900 |
| | | | 110 | | 4.813 | 5.188 | 7,450 | 11,200 |
| 11¾ | 65 | BTC | 55 | 12.750 | 4.813 | 5.188 | 7,700 | 11,550 |
| | | | 75 | | 4.813 | 5.188 | 8,050 | 12,100 |
| | | | 80 | | 4.813 | 5.188 | 8,100 | 12,150 |
| | | | 90 | | 4.813 | 5.188 | 8,300 | 12,450 |
| | | | 95 | | 4.813 | 5.188 | 8,350 | 12,550 |
| | | | 110 | | 4.813 | 5.188 | 8,600 | 12,900 |
| 13⅜ | 54.5 | BTC | 55 | 14.375 | 4.813 | 5.188 | 6,200 | 9,300 |
| 13⅜ | 61 | BTC | 55 | 14.375 | 4.813 | 5.188 | 6,450 | 9,700 |
| 13⅜ | 68 | BTC | 55 | 14.375 | 4.813 | 5.188 | 6,600 | 9,900 |
| | | | 75 | | 4.813 | 5.188 | 6,900 | 10,350 |
| | | | 80 | | 4.813 | 5.188 | 6,950 | 10,450 |
| | | | 90 | | 4.813 | 5.188 | 7,100 | 10,650 |
| | | | 95 | | 4.813 | 5.188 | 7,150 | 10,750 |
| | | | 110 | | 4.813 | 5.188 | 7,400 | 11,100 |
| 13⅜ | 72 | BTC | 75 | 14.375 | 4.813 | 5.188 | 7,300 | 10,950 |
| | | | 80 | | 4.813 | 5.188 | 7,350 | 11,050 |
| | | | 90 | | 4.813 | 5.188 | 7,500 | 11,250 |
| | | | 95 | | 4.813 | 5.188 | 7,600 | 11,400 |
| | | | 110 | | 4.813 | 5.188 | 7,850 | 11,800 |

TABLE 2

API BUTTRESS GAS SEALABILITY TEST RESULTS

| SIZE (INCH) | WEIGHT (LB/FT) | GRADE (KSI) | PLATING | THREAD COMPOUND | MAKEUP POSITION | PASS/FAIL |
|---|---|---|---|---|---|---|
| 8.625 | 36 | 80 | PHOSPHATE | API MODIFIED | TRIANGLE - BASE | FAIL |
| 9.625 | 47 | 80 | PHOSPHATE | API MODIFIED | TRIANGLE - BASE | FAIL |
| 9.625 | 47 | 80 | PHOSPHATE | API MODIFIED | TRIANGLE - APEX | PASS |
| 9.625 | 47 | 110 | PHOSPHATE | API MODIFIED | TRIANGLE - BASE | FAIL |
| 9.625 | 47 | 110 | PHOSPHATE | API MODIFIED | TRIANGLE - APEX | FAIL |
| 10.75 | 51 | 80 | PHOSPHATE | API MODIFIED | TRIANGLE - BASE | FAIL |
| 10.75 | 51 | 80 | PHOSPHATE | API MODIFIED | TRIANGLE - APEX | PASS |
| 11.75 | 65 | 80 | PHOSPHATE | API MODIFIED | TRIANGLE - BASE | FAIL |
| 13.375 | 72 | 80 | PHOSPHATE | API MODIFIED | TRIANGLE - BASE | FAIL |

TABLE 2-continued
API BUTTRESS GAS SEALABILITY TEST RESULTS

| SIZE (INCH) | WEIGHT (LB/FT) | GRADE (KSI) | PLATING | THREAD COMPOUND | MAKEUP POSITION | PASS/FAIL |
|---|---|---|---|---|---|---|
| 13.375 | 72 | 110 | PHOSPHATE | API MODIFIED | TRIANGLE - BASE | FAIL |
| 8.625 | 36 | 80 | PHOSPHATE | LOR #304 | TRIANGLE - BASE | FAIL |
| 9.625 | 47 | 80 | PHOSPHATE | LOR #304 | TRIANGLE - BASE | FAIL |
| 9.625 | 47 | 110 | PHOSPHATE | LOR #304 | TRIANGLE - BASE | FAIL |
| 10.75 | 51 | 80 | PHOSPHATE | LOR #304 | TRIANGLE - BASE | FAIL |
| 11.75 | 65 | 80 | PHOSPHATE | LOR #304 | TRIANGLE - BASE | FAIL |
| 13.375 | 72 | 80 | PHOSPHATE | LOR #304 | TRIANGLE - BASE | FAIL |
| 13.375 | 72 | 110 | PHOSPHATE | LOR #304 | TRIANGLE - BASE | FAIL |
| 8.625 | 36 | 80 | SEAL-RING | API MODIFIED | TRIANGLE - BASE | PASS |
| 9.625 | 47 | 80 | SEAL-RING | API MODIFIED | TRIANGLE - BASE | PASS |
| 9.625 | 47 | 110 | SEAL-RING | API MODIFIED | TRIANGLE - BASE | FAIL |
| 10.75 | 51 | 80 | SEAL-RING | API MODIFIED | TRIANGLE - BASE | PASS |
| 11.75 | 65 | 80 | SEAL-RING | API MODIFIED | TRIANGLE - BASE | PASS |
| 13.375 | 72 | 80 | SEAL-RING | API MODIFIED | TRIANGLE - BASE | PASS |
| 13.375 | 72 | 110 | SEAL-RING | API MODIFIED | TRIANGLE - BASE | PASS |
| 8.625 | 36 | 80 | TIN | API MODIFIED | TRIANGLE - BASE | PASS |
| 9.625 | 47 | 80 | TIN | API MODIFIED | TRIANGLE - BASE | PASS |
| 9.625 | 47 | 110 | TIN | API MODIFIED | TRIANGLE - BASE | FAIL |
| 10.75 | 51 | 80 | TIN | API MODIFIED | TRIANGLE - BASE | PASS |
| 11.75 | 65 | 80 | TIN | API MODIFIED | TRIANGLE - BASE | PASS |
| 13.375 | 72 | 80 | TIN | API MODIFIED | TRIANGLE - BASE | PASS |
| 13.375 | 72 | 110 | TIN | API MODIFIED | TRIANGLE - BASE | FAIL |
| 8.625 | 36 | 80 | TIN | LOR #304 | TRIANGLE - BASE | PASS |
| 8.625 | 49 | 110 | TIN | LOR #304 | TRIANGLE - BASE | PASS |
| 9.625 | 47 | 80 | TIN | LOR #304 | TRIANGLE - BASE | PASS |
| 9.625 | 47 | 110 | TIN | LOR #304 | TRIANGLE - BASE | PASS |
| 10.75 | 51 | 80 | TIN | LOR #304 | TRIANGLE - BASE | PASS |
| 10.75 | 65.7 | 110 | TIN | LOR #304 | TRIANGLE - BASE | PASS |
| 11.75 | 60 | 110 | TIN | LOR #304 | TRIANGLE - BASE | PASS |
| 11.75 | 65 | 80 | TIN | LOR #304 | TRIANGLE - BASE | PASS |
| 13.375 | 72 | 80 | TIN | LOR #304 | TRIANGLE - BASE | PASS |
| 13.375 | 72 | 110 | TIN | LOR #304 | TRIANGLE - BASE | PASS |
| 8.625 | 24 | 55 | TIN | LOR #304 | BASE - 0.30 INCH | FAIL |
| 9.625 | 36 | 55 | TIN | LOR #304 | BASE - 0.30 INCH | FAIL |
| 11.75 | 65 | 80 | TIN | LOR #304 | BASE - 0.30 INCH | FAIL |
| 8.625 | 24 | 55 | TIN | LOR #304 | BASE - 0.20 INCH | PASS |
| 9.625 | 36 | 55 | TIN | LOR #304 | BASE - 0.20 INCH | PASS |
| 9.625 | 40 | 80 | TIN | LOR #304 | BASE - 0.20 INCH | FAIL |
| 9.625 | 53.5 | 110 | TIN | LOR #304 | BASE - 0.20 INCH | PASS |
| 10.75 | 40.5 | 55 | TIN | LOR #304 | BASE - 0.20 INCH | FAIL |
| 10.75 | 51 | 80 | TIN | LOR #304 | BASE - 0.20 INCH | FAIL |
| 11.75 | 65 | 80 | TIN | LOR #304 | BASE - 0.20 INCH | PASS |
| 13.375 | 68 | 55 | TIN | LOR #304 | BASE - 0.20 INCH | FAIL |
| 9.625 | 40 | 80 | TIN | LOR #304 | BASE - 0.10 INCH | FAIL |
| 10.75 | 40.5 | 55 | TIN | LOR #304 | BASE - 0.10 INCH | PASS |
| 10.75 | 51 | 80 | TIN | LOR #304 | BASE - 0.10 INCH | FAIL |
| 13.375 | 68 | 55 | TIN | LOR #304 | BASE - 0.10 INCH | FAIL |
| 13.375 | 72 | 80 | TIN | LOR #304 | BASE - 0.10 INCH | PASS |
| 13.375 | 72 | 110 | TIN | LOR #304 | BASE - 0.10 INCH | FAIL |

TABLE 3
SEALABILITY TEST LOADING CONDITIONS

| LOAD STEP | INTERNAL PRESSURE % IYP | AXIAL LOAD % PBYS | BENDING DEG/100 FT |
|---|---|---|---|
| 1 | 0 | 0 | 0 |
| 2 | 50 | 0 | 0 |
| 3 | 80 | 0 | 0 |
| 4 | 0 | 0 | 0 |
| 5 | 50 | 67 | 0 |
| 6 | 80 | 67 | 0 |
| 7 | 80 | 75 | 0 |
| 8 | 0 | 0 | 0 |
| 9 | 0 | −50 | 0 |
| 10 | 50 | −50 | 0 |
| 11 | 80 | −33 | 0 |
| 12 | 0 | 0 | 0 |
| 13 | 50 | 0 | 5 |
| 14 | 80 | 0 | 5 |
| 15 | 80 | 0 | 10 |
| 16 | 0 | 0 | 0 |
| 17 | 50 | 67 | 5 |
| 18 | 80 | 67 | 5 |
| 19 | 80 | 67 | 10 |
| 20 | 0 | 0 | 0 |
| 21 | 50 | −50 | 5 |
| 22 | 80 | −50 | 5 |
| 23 | 80 | −33 | 10 |
| 24 | 0 | 0 | 0 |
| 25 | 80 | 67 | 0 |

What is claimed is:

1. A method of connecting threaded pipe sections to form a made-up thread casing, comprising the steps of:
   a) providing a first pipe section including an externally threaded pin member having a face at its end, said first thread section having been marked with a triangle stamp in accordance with API Specification Std. 5B, Section 2 (13th ed. May 31, 1988);
   b) providing a second pipe section including a corresponding internally threaded box member having a face at its end;
   c) plating the threads of said box member with tin;

d) applying a thread lubricant containing Teflon ™ or a material substantially similar to Teflon ™ to the threads of said threaded box member;

e) helically rotating the pin member and box member together until the base of said triangle stamp at least aligns with the face of said threaded box member or helically rotating further, but in no event helically rotating so far that said triangle stamp is completely covered by said threaded box member;

f) determining that the made-up casing is acceptable during helically rotating together of the pin member and box member when (1) the face of the end of the box member is properly positioned relative to the triangle mark on the first pipe section, and (2) the make-up torque is within a predetermined make-up torque range, or g) determining that the made-up casing should be rejected when either (1) the face of the end of the box member completely covers the triangle mark when less than a minimum of the predetermined make-up torque range is applied to the made-up casing; or (2) the face of the end of the box member does not align with any point within the area circumscribed by the edges of said triangle stamp when a maximum of the predetermined make-up torque range is applied to the joint, and h) terminating the helical rotation when the made-up casing is determined to be acceptable or to be rejected.

2. The method of claim 1 where the predetermined make-up torque range is determined by the steps of:

a) calculating a theoretical make-up torque required for proper sealing positioning for certain size, weight, grade and thread form of the pipe section by finite element analysis;

b) measuring an actual make-up torque required for proper sealing at an axially engaged position for a certain size, weight, grade and thread form of pipe, and c) comparing the theoretical make-up torque and the actual make-up torque to establish a corresponding friction factor for use in predicting required make-up torque for a wide range of thread sizes, weights and grades without requiring actual make-up torque measurements.

3. The method of claim 1 wherein said second pipe section is a coupling.

4. The method of claim 1 wherein said tin plating is 0.0035 inch±0.001 inch thick.

* * * * *